Nov. 28, 1950     O. J. DE WALL     2,531,560
BUNCHER FOR BALED HAY
Filed July 12, 1947     3 Sheets-Sheet 1
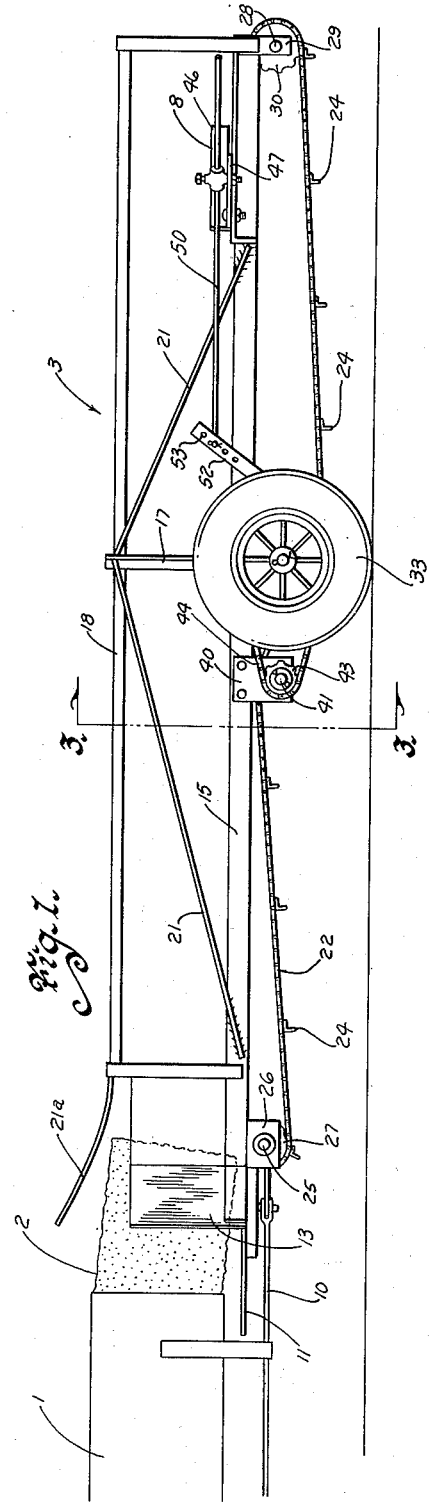
Inventor
Otto J. De Wall
by Harry L. Yinger
Attorney

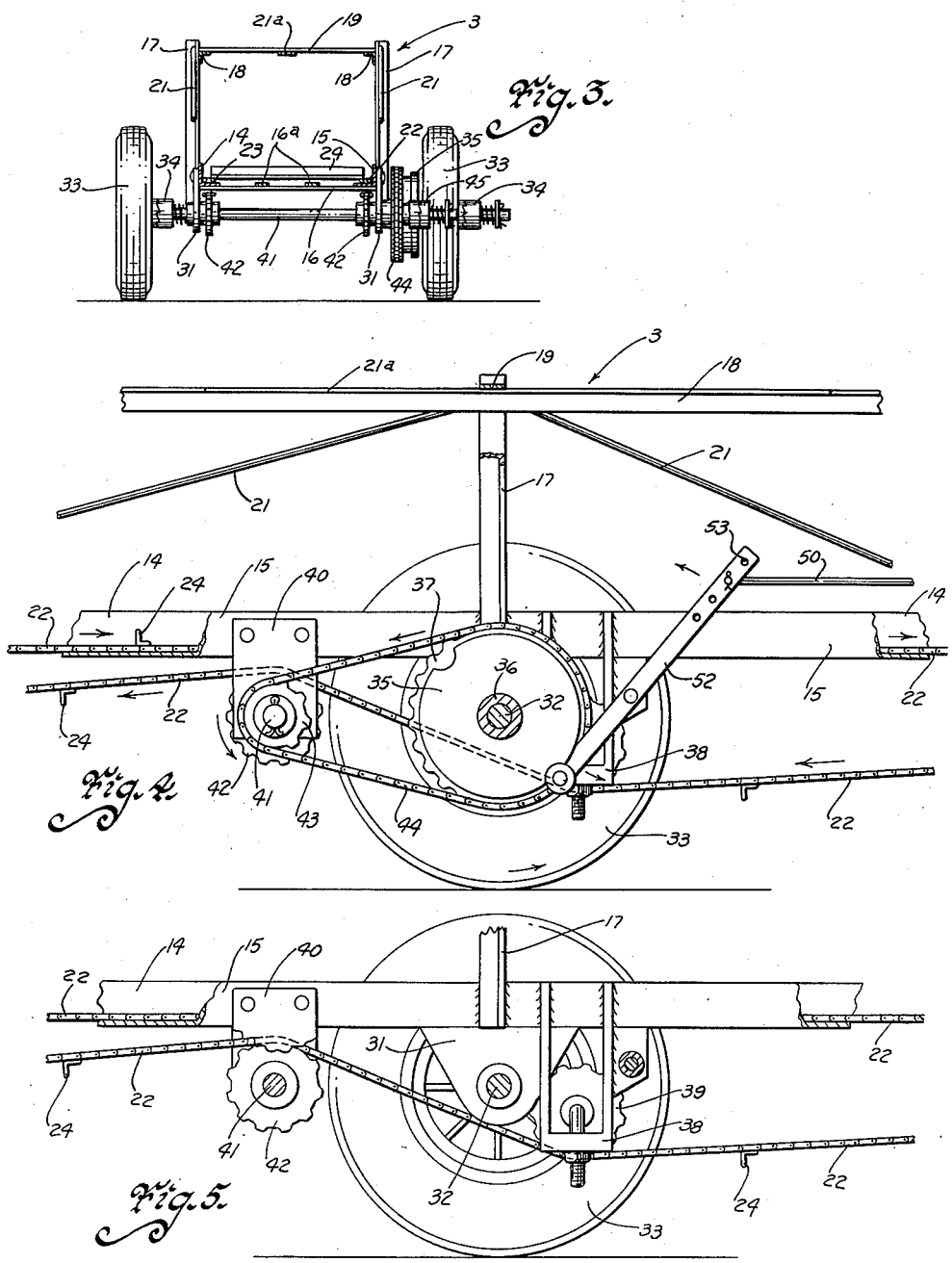

Nov. 28, 1950        O. J. DE WALL        2,531,560
BUNCHER FOR BALED HAY
Filed July 12, 1947        3 Sheets-Sheet 3
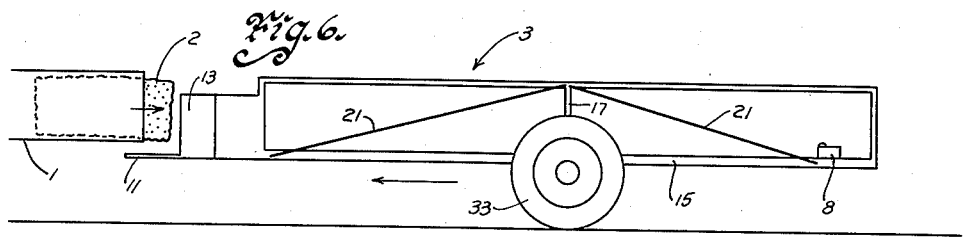
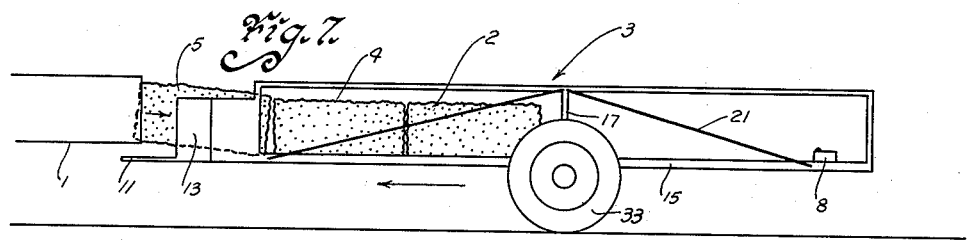
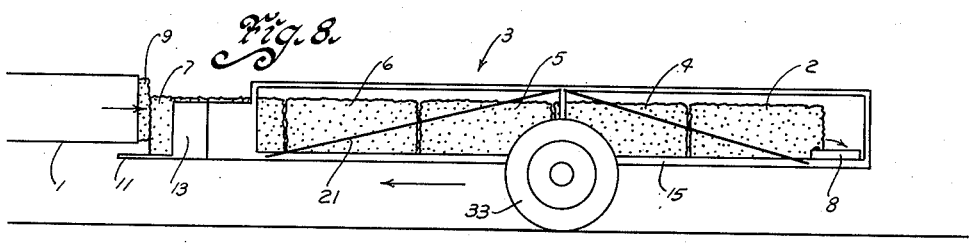
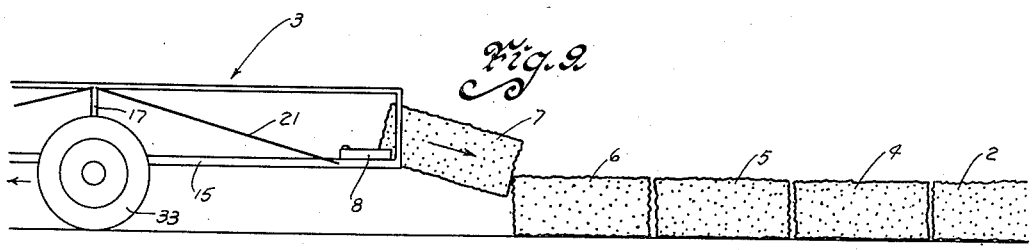
Witness
Edward P. Seeley
Inventor
Otto J. DeWall
By Harry L. Yunger
Attorney Patented Nov. 28, 1950

2,531,560

UNITED STATES PATENT OFFICE 2,531,560

BUNCHER FOR BALED HAY

Otto J. De Wall, Titonka, Iowa

Application July 12, 1947, Serial No. 760,545

5 Claims. (Cl. 214—83.36)

This invention relates to a baled hay buncher vehicle unit to be attached to a hay baler mechanism and more particularly to a baled hay buncher vehicle attached to a hay baler mechanism to receive bales of hay discharged from the hay baler mechanism; to retain the bales of hay on the spacer vehicle until a group of bales is collected and then discharging the group of bales to the ground.

In present haying operations, the hay is put up into bales for compactness of handling and ease of storage. Hay baler mechanisms are perfected and in operation which travel over a field of cut hay, picking up the hay from the ground; putting it into a bale; tying the bale and then discharging the bale of hay unto the ground. Loading devices are available to pick the bales of hay up from the ground and transport the bales of hay to a conveying vehicle, such as a truck. When single bales are discharged from a hay baler mechanism, the individual bales are scattered all over the field in no particular regular pattern, hence it is extremely difficult to convey the bale loader to each bale. It is necessary, even with the bale loader, to have a number of men to pick up and carry bales of hay not in the path of the bale loader to a truck. It is with the problem of assembling the bales of hay issuing from the hay baler mechanism on the ground so as to be more convenient to pick up that the present invention is concerned.

It is an object of the invention, among others, to provide a buncher vehicle unit to be attached to a hay baler mechanism to receive baled hay from a hay baler mechanism, retain the bales of hay on the buncher until a group of bales is assembled on the buncher vehicle at which time the buncher vehicle operates to discharge the group of bales to the ground automatically and the buncher vehicle is automatically set to receive another group of bales; a buncher vehicle unit to be attached to a hay baler mechanism to receive baled hay and discharged the baled hay in a group on the ground which makes it more economical to pick up the baled hay in the field in that a bale loader can be used to pick up all the baled hay since it is in a group, requires less men for the picking up operation and can be done in half the time required to pick up single bales; a buncher vehicle unit simple in construction and operation, easy to operate and economical both in construction and operation; a buncher vehicle that is long lasting and durable in operation, requiring few repairs and lost time in operation; a buncher vehicle easy to operate in that its operation is automatic; simple in design and easy of repair in case of breakdown; a buncher vehicle only requiring attachment to a hay baler mechanism and forward motion to be set into operation; and a buncher vehicle that can be supplied and operated at an economical price.

In carrying out the objects of the invention there is provided a buncher vehicle unit for baled hay attachable to a hay baler mechanism to collect bales of hay from the hay baler until a group of bales is collected on the buncher vehicle at which time the group of bales is discharged from the buncher vehicle to the ground. The buncher vehicle includes a platform on the buncher vehicle to receive the bales discharged from the hay baler which platform may be movable by force of each bale issuing from the hay baler moving the bales and platform until a group of bales is collected on the buncher vehicle. The platform may be an endless belt running from one end of the buncher vehicle to the other end which endless belt is connected through a clutch means with an axle between wheels of the vehicle. The platform is movable when the clutch is disengaged through a slip coupling that allows movement of the platform by force of each bale issuing from the hay baler against the preceding bale. The buncher vehicle has a body portion supported on the axle between the wheels and the clutch is associated with the axle to carry power from the axle to the platform when the clutch is engaged. A shaft is journaled in the body portion and rotated by connection through the clutch with the axle and the platform connection with said shaft so as to be rotatable by the shaft. The slip coupling is associated with the shaft and allows movement of the platform by the force on each bale issuing from the hay baler.

There are means on the buncher vehicle that are actuated when a group of bales is collected on the platform and reach the end of the platform to discharge the group of bales from the buncher vehicle to the ground by setting the platform into motion. The platform is connected with a power source on the buncher vehicle to set the platform into motion. The means may be a trigger extending into the pathway of the bales and contacted by the first and subsequent bales of the group to connect the platform with the power source. The trigger has means which may be a spring, connected therewith to disconnect the power source from the platform and put the trigger in the pathway of the bales again when the last bale of the group passes the trigger. The trigger means is attached to the clutch associated with the axle and acts to engage the clutch with the axle. The trigger is pivotally connected to the body portion of the vehicle with one end of the trigger connected to the clutch and the other end extending into the pathway of the bales on the platform.

With the foregoing and other objects in view, the invention will be more fully described herewith and will be particularly pointed out in the claims appended hereto.

In the drawings, wherein like symbols refer to like or corresponding parts throughout the several views:

Figure 1 is a side elevational view of the buncher vehicle shown attached to a hay baler mechanism.

Figure 2 is a top plan view of the buncher vehicle with the trigger being shown actuated and in dotted lines.

Figure 3 is a sectional view of the buncher vehicle taken on the line 3—3 of Figure 1.

Figure 4 is a sectional view of the buncher vehicle taken on the line 4—4 of Figure 2.

Figure 5 is a sectional view of the buncher vehicle taken on the line 5—5 of Figure 2.

Figure 6 is a diagrammatic view showing the buncher vehicle trailing the hay baler mechanism and about to receive a bale of hay being discharged from the hay baler.

Figure 7 is a diagrammatic view showing two bales of hay on the buncher vehicle and a third bale issuing from the hay baler mechanism.

Figure 8 is a diagrammatic view showing the buncher vehicle loaded with a group of bales, namely five bales of hay, and a sixth bale still on the hay baler exerting force on the group.

Figure 9 is a diagrammatic view showing the group of five bales being discharged from the buncher vehicle and piled on the ground in close proximity to each other.

Referring first to the diagrammatic views of Figures 6 to 9, the invention will be pointed out first as regards the method employed. The numeral 1 represents the back portion of a hay baler mechanism. Any hay baler mechanism can be employed and several different types are now available on the market. The hay baler scoops the hay up off the ground, delivers it to a compacting chamber where it is tied with baling wire when of sufficient size. The bale of hay is forced out of the compacting chamber by the compacting of the next bale. The rear portion of most hay balers will hold about two and one-half bales so as the third bale becomes completed it will have forced the first bale half way off the rear of the baler.

Figure 6 shows the bale of hay 2 just starting to emerge from the hay baler 1 and the bale 2 would fall to the ground when it was forced sufficiently out of the hay baler 1 to disturb its equilibrium. Instead of falling to the ground the buncher vehicle unit 3 is attached to the hay baler 1 and is towed thereby in the direction indicated by the arrow. The bale 2 instead of falling to the ground is received by the buncher vehicle 3.

Figure 7 shows the bale 2 forced rearwardly on the buncher vehicle 3 by bale 4 already on the buncher vehicle 3 and bale 5 just issuing from the hay baler 1 in the direction of the arrow.

Figure 8 shows additional bales 6 and 7 on the buncher vehicle 3 which makes five bales now on the buncher vehicle 3 and constitutes a group of bales. The forward bale 2 contacts an actuation means 8 upon being forced further to the rearward by the bale 9 just emerging from the hay baler 1. As bale 9 is forced further to the rearward, it also forces bales 7, 6, 5, 4 and 2 to the rearward until the bale 2 forces the actuation means 8 into the position in Figure 8 to set mechanism into operation on the buncher vehicle to discharge the group of bales.

Figure 9 illustrates four of the bales 2, 4, 5 and 6 of the group discharged from the buncher vehicle 3 and the fifth bale 7 just been discharged. The bales 2, 4, 5, 6 and 7 align themselves on the ground in a group, end to end, just as they were aligned on the buncher vehicle 3. The fifth bale 7 has not as yet been discharged and is still holding the actuation means 8 in actuated position. When the bale 7 passes by the actuation means 8, nothing is left to hold actuation means in actuated position, hence it returns to its original position and stops the mechanism on the buncher vehicle 3 which discharged the group of bales 2, 4, 5, 6 and 7. It is noted that the group of bales 2, 4, 5, 6 and 7 will discharge with sufficient speed so that the bale 9 will not have advanced sufficiently far onto the buncher vehicle 3 to be discharged with the group 2, 4, 5, 6 and 7 but will form the first bale of the next group to be collected.

Turning now to Figure 1, the buncher vehicle is shown coupled to hitch 10 on the hay baler 1 and the buncher vehicle 3 is a trailer unit pulled by the hay baler 1. The buncher vehicle 3 has an end gate or receiving member 11 on which the bales issuing from the hay baler 1 are received as clearly shown for the bale 2 in Figure 1. Angular side portions 12 and 13 are attached to the member 11 and serve to guide the bales into the buncher vehicle 3.

The buncher vehicle 3 has a body portion, made up of side supporting members 14 and 15, which may be angle irons of about 3" x 4" held spaced and supported together by cross straps 16. Upright members 17, which are three in number as shown on each side of the body portion, are welded to angle irons 14 and 15 and receive longitudinal straps 18 along their top edges and cross strips, one of which is shown at 19, tie the longitudinal straps 18 together. The body portion may be suitably reenforced as by cross braces 21. Longitudinal runners 16a run the length of the buncher vehicle and are attached to the cross straps 16 to form part of a supporting floor. The body portion, as just described serves as both a support and guide for the passage of the bales through the buncher vehicle. A strap 21a mounted on the top of the body portion is bent to serve as a top guide for a bale entering the buncher vehicle as clearly shown in Figure 1.

A platform, which in effect is endless sprocket chain 22 and 23 having cross bars or cleats 24, runs from end to end of the vehicle and are the means that moves the bales of hay forming the group from the forward end of the buncher vehicle 3 to the rearward end. An idler shaft 25 is journaled in brackets 26 attached to angle irons 14 and 15 and has sprocket wheels 27 to carry sprocket chains 22 and 23 from the under side of the body portion and unto the floor portion to provide the platform. The sprocket chains 22 and 23 ride within and are supported on angle irons 14 and 15 as clearly shown in Figures 4 and 5. The cross bars 24 attached across sprocket chains 22 and 23 ride on the longitudinal runners 16a to provide a supporting floor for the platform. The rear end of the buncher vehicle 3 has another idler shaft 28 journaled in brackets 29 attached to angle irons 14 and 15. The sprocket chains 22 and 23 pass over sprocket wheel 30 to return under the buncher vehicle 3.

Brackets 31 (Figure 5) are attached to the angle irons 14 and 15 and depend downwardly and have journaled therein an axle 32. The axle 32 carries the wheels 33 on each end thereof and ratchet slip couplings 34 which are common on wheels of farm machinery for allowing the inner wheel to turn slowly while a turn of a vehicle is being made. A clutch 35 is associated with axle housing 36 and has a means (not shown) to engage the axle 32. A sprocket wheel 37 is connected with the clutch 35 and is rotated when the cluch 35 is in engagement with axle 32.

Brackets 38 (Figure 5) are attached to each angle iron 14 and 15 and have a sprocket wheel 39 adjustable therein. The brackets 38 and sprocket wheels 39 serve as a guide means for the endless chains 22 and 23 in their return travel under the buncher vehicle 3. The sprocket wheels 39 can also be adjusted to provide or take up slack in the chains 22 and 23 as the case may be. The brackets 38 and sprocket wheels 39 serve to guide the chains 22 and 23 under axle 32.

Bracket members 40, depending from angle irons 14 and 15 have a shaft 41 journaled in the brackets 40. Sprocket wheels 42 are attached to shaft 41 on each side of the shaft 41 and the endless chains 22 and 23 pass over sprocket wheels 42. A second sprocket wheel 43 is attached to the shaft 41 and is connected by sprocket chain 44 to the sprocket wheel 35 on axle 32. When clutch 35 is engaged with the axle 32, sprocket wheel 35 will rotate and by sprocket chain 44 will transmit power to sprocket wheel 43 and rotate shaft 41. The sprocket wheels 42 rotate with the shaft 41 hence when shaft 41 rotates, the endless chains 22 and 23 passing over sprocket wheels 42 will also be rotated and the platform is made to rotate. A ratchet slip coupling 45 is included with shaft 41, the same as the ratchet slip couplings 34 on the axle 32. The ratchet slip coupling 45 allows the endless chains 22 and 23 to move when the clutch 35 is not engaged with the axle 32. As the bales are discharged from the hay baler 1, the bales are pushed rearwardly on the buncher vehicle 3 by each following bale. When bales reach the platform, instead of having to slip the bales along the platform, the platform will move, without the sprocket wheel 43 rotating by the ratchet slip coupling 45 allowing the slip.

The mechanism 8 comprises a trigger member pivotally mounted to the angle iron 15 with one arm 46 extending into the body portion and into the pathway of the bales traveling through the body portion while the other end 47 of the trigger connects with means running to the clutch 35. A series of openings 48 are spaced along the angle iron 15 and are the openings into which the trigger is attached. The series of openings 48 are to allow for adjustment of the trigger for different length bales. A spring 49 connects with the arm 47 and into an opening 48 and operates to pull arm 47 to the right and pivot the arm 46 into the pathway of travel of the bales within the body portion. A rod 50 attaches to arm 47 by a clamp fitting into any number of openings 51 in the arm 47. The rod 50 connects into an arm 52 pivotally connected into bracket 38 and with a series of openings 53 on the upper end into which the rod 50 can attach. The lower end of arm 52 attaches with clutch 35. When arm 52 has the upper portion thereof pulled to the right, the lower portion of arm 52 pivots to the left and engages clutch 35 with axle 32.

In operation the bales are moved by the platform until a group of five bales is on the buncher vehicle as previously described. When it is determined how far the group of five bales will reach the trigger mechanism is set in the proper opening 48, with rod 50 being located in proper openings 51 and 53. The structure is then ready to operate. When the bale 2 (Figure 2) has advanced to the position shown, the trigger arm 46 will be moved to the dotted line position which pivots the arm 47 to the dotted line position storing up a tension force in the spring 49. The rod 50 moves forwardly, or to the left to the dotted line position of Figure 2. Referring now to Figure 4, the upper portion of arm 52 moves to the right, pivoting the lower portion of arm 52 into engagement with clutch 35 which engages the clutch with axle 32. Sprocket wheel 37 will then rotate through its engagement with clutch 35 and rotate sprocket chain 44 which in turn will rotate sprocket wheel 43. The sprocket wheel 43 will rotate shaft 41 and sprocket wheels 42 attached thereto and in turn the platform since endless belts 22 and 23 pass over the sprocket wheels 42.

The platform will move until the fifth bale of the group passes the trigger arm 46. Spring 49 will then pull the arm 47 to the right throwing the arm 46 into the pathway of the bales again and disengaging clutch 35 to stop movement of the platform.

No specific clutch structure has been described because many types of clutches are now on the market that would operate in the structure and it is thought to be no more than mechanical skill to incorporate a clutch with the axle.

It will be understood that the invention has been described for purposes of illustration and explanation and that changes and variations are possible without departing from the scope of the invention; all such modifications and changes are intended to be included in the appended claims.

I claim:

1. A buncher vehicle unit for baled hay attachable to a hay baler mechanism to collect bales of hay from the hay baler until a group of bales is collected on the buncher vehicle at which time the group of bales is discharged from the buncher vehicle to the ground comprising an endless belt running from one end of the buncher vehicle to the other end to form a platform to receive the bales discharged from the hay baler, said platform connected through a clutch means to an axle between wheels of the vehicle, said platform being movable when the clutch is disengaged through a slip coupling that allows movement of the platform by force of each bale issuing from the hay baler moving the bales and platform until a group of bales is collected on the buncher vehicle, a trigger extending into the pathway of the bales and contacted by the first and subsequent bales of the group to move the trigger and a spring attached to the trigger to pull the trigger into the pathway of the bales again and to disengage the clutch from the axle when the last bale of the group passes the trigger.

2. A buncher vehicle unit for baled hay attachable to a hay baler mechanism to collect bales of hay from the hay baler until a group of bales is collected on the buncher vehicle at which time the group of bales is discharged from the buncher vehicle to the ground comprising a body portion supported on an axle between wheels, an endless belt forming a platform to receive bales discharged from the hay baler running from end to end of the body portion, a clutch associated with the axle to carry power from the axle to the platform when the clutch is engaged and a trigger pivotally connected to the body portion of the vehicle having one end connected with the clutch and the other end extending into the pathway of the bales moving along the body portion of the buncher vehicle, said trigger being pivoted about the body portion when a group of bales is collected on the platform to engage the clutch to the axle to conduct power to the platform to discharge the group of bales from the buncher vehicle to the ground.

3. A buncher vehicle unit for baled hay attachable to a hay baler mechanism to collect bales of hay from the hay baler until a group of bales is collected on the buncher vehicle at which time the group of bales is discharged from the buncher vehicle to the ground comprising a body portion supported on an axle between wheels, an endless belt forming a platform to receive bales discharged from the hay baler running from end to end of the body portion, a clutch associated with the axle to carry power from the axle to the platform when the clutch is engaged, a shaft journaled in the body portion and rotated by connection through the clutch with the axle, said platform connected with the shaft and rotatable by the shaft, and a trigger pivotally connected to the body portion of the vehicle having one end connected with the clutch and the other end extending into the pathway of the bales moving along the body portion of the buncher vehicle, said trigger being pivoted about the body portion when a group of bales is collected on the platform to engage the clutch with the axle to conduct power to the platform to discharge the group of bales from the buncher vehicle to the ground.

4. A buncher vehicle unit for baled hay attachable to a hay baler mechanism to collect bales of hay from the hay baler until a group of bales is collected on the buncher vehicle at which time the group of bales is discharged from the buncher vehicle to the ground comprising a body portion supported on an axle between wheels, an endless belt forming a platform to receive bales discharged from the hay baler running from end to end of the body portion, a clutch associated with the axle to carry power from the axle to the platform when the clutch is engaged, a shaft journaled in the body portion and rotatable by connection through the clutch with the axle, said platform connected with the shaft and rotatable by the shaft, a slip coupling associated with the shaft to allow rotation of the platform by the bales discharging from the hay baler by the force of each bale against the preceding bail moving the platform until a group of bales is collected on the buncher vehicle and a trigger pivotally connected to the body portion of the vehicle having one end connected with the clutch and the other end extending into the pathway of the bales moving along the body portion of the buncher vehicle, said trigger being pivoted about the body portion when a group of bales is collected on the platform to engage the clutch with the axle to conduct power to the platform to discharge the group of bales from the buncher vehicle to the ground.

5. A buncher vehicle unit for baled hay attachable to a hay baler mechanism to collect bales of hay from the hay baler until a group of bales is collected on the buncher vehicle at which time the group of bales is discharged from the buncher vehicle to the ground comprising a body portion supported on an axle between wheels, an endless belt forming a platform to receive bales discharged from the hay baler running from end to end of the body portion, a clutch associated with the axle to carry power from the axle to the platform when the clutch is engaged, a shaft journaled in the body portion and rotatable by connection through the clutch with the axle, said platform connected with the shaft and rotatable by the shaft, a slip coupling associated with the shaft to allow rotation of the platform by the bales discharging from the hay baler by the force of each bale against the preceding bail moving the platform until a group of bales is collected on the buncher vehicle and a spring attached to the trigger to pull the trigger into the pathway of the bales again to disengage the clutch from the axle when the last bale of the group passes the trigger.

OTTO J. DE WALL.

REFERENCES CITED

The following references are of record in the file of this patent:

UNITED STATES PATENTS

| Number | Name | Date |
|---|---|---|
| 1,553,706 | Meink | Sept. 15, 1925 |
| 1,913,533 | Brunner | June 13, 1933 |
| 2,065,973 | Jones | Dec. 29, 1936 |
| 2,316,435 | James | Apr. 13, 1943 |
| 2,327,264 | Hendrickson | Aug. 17, 1943 |
| 2,390,306 | Hunziker | Dec. 4, 1945 |
| 2,410,516 | Messenger et al. | Nov. 5, 1946 |
| 2,448,737 | Reisenweber | Sept. 7, 1948 |
| 2,453,384 | Renken | Nov. 9, 1948 |